US012750643B2

(12) United States Patent
Vassilovski et al.

(10) Patent No.: US 12,750,643 B2
(45) Date of Patent: Sep. 29, 2026

(54) WIRELESS COMMUNICATIONS USING DYNAMIC TRANSMISSION FREQUENCY

(71) Applicant: QUALCOMM Incorporated, San Diego, CA (US)

(72) Inventors: Dan Vassilovski, Del Mar, CA (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 18/466,419

(22) Filed: Sep. 13, 2023

(65) Prior Publication Data

US 2025/0088830 A1 Mar. 13, 2025

(51) Int. Cl.
*H04W 4/40* (2018.01)
*H04W 4/02* (2018.01)

(52) U.S. Cl.
CPC ............... *H04W 4/40* (2018.02); *H04W 4/02* (2013.01)

(58) Field of Classification Search
None
See application file for complete search history.

(56) References Cited

U.S. PATENT DOCUMENTS

| | | | | |
|---|---|---|---|---|
| 9,048,960 B2 * | 6/2015 | Li | ........................... | H04W 4/46 |
| 9,685,086 B2 * | 6/2017 | Zhang | .................... | G08G 1/161 |
| 10,304,339 B2 * | 5/2019 | Jiang | ................. | B60W 50/0098 |
| 2018/0342154 A1 * | 11/2018 | Lee | .......................... | H04W 4/70 |
| 2020/0196321 A1 * | 6/2020 | Zhang | ................... | H04W 72/21 |

FOREIGN PATENT DOCUMENTS

| | | | | |
|---|---|---|---|---|
| EP | 4112411 B1 * | 3/2024 | ............ | B60W 50/14 |

* cited by examiner

*Primary Examiner* — Adolf Dsouza
(74) *Attorney, Agent, or Firm* — Harrity & Harrity, LLP

(57) ABSTRACT

Wireless communications systems, apparatuses, and methods are provided. A method of wireless communication performed by a user equipment (UE) may include transmitting, to a network unit, activity information associated with the UE, receiving, from the network unit, an indication of a transmission frequency for transmitting a notification. The transmission frequency may be based at least in part on the activity information associated with the UE. The method may further include transmitting the notification based on the transmission frequency.

30 Claims, 12 Drawing Sheets

400

500

600

700

WIRELESS COMMUNICATIONS USING DYNAMIC TRANSMISSION FREQUENCY

TECHNICAL FIELD

This application relates to wireless communication systems, and more particularly, to improving wireless communications between a user equipment (UE) and other wireless communication devices, including a UE of a vulnerable road user (VRU) sending a safety message.

INTRODUCTION

Wireless communications systems are widely deployed to provide various types of communication content such as voice, video, packet data, messaging, broadcast, and so on. Safety messages, such as personal safety message (PSM) defined by SAE and vulnerable road user (VRU) awareness message (VAM) defined by ETSI, may allow cellular-vehicle-to-everything (C-V2X) capable UEs held by VRUs (e.g., pedestrians, joggers, cyclists, etc.) to broadcast their location, motion state, path history, and path prediction information to other C-V2X devices (e.g., vehicles, roadside units (RSUs), and other VRUs). A transmission frequency for transmitting such safety message (e.g., 1 Hz to 10 Hz) may be determined by the speed of UE held by the VRU.

However, there is no mechanism for adjusting the transmission frequency for the safety message based on static environmental conditions (e.g., a presence of protected bike lanes or sidewalks, etc.), dynamic environmental conditions (e.g., a number of surrounding vehicles, visibility conditions, etc.), and/or location-specific and type-specific historical conditions (e.g., intersection propensity for VRU accidents).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a UE, the method comprising transmitting, to a network unit, activity information associated with the UE, receiving, from the network unit, an indication of a transmission frequency for transmitting a notification, wherein the transmission frequency is based at least in part on the activity information associated with the UE, and transmitting the notification based on the transmission frequency.

In an additional aspect of the disclosure, a method of wireless communication performed by a first wireless communication device may include receiving, from one or more first UEs and one or more second wireless communication devices, data associated with the one or more first UEs, and sending, to the one or more first UEs, an indication of a transmission frequency for transmitting a notification, wherein the transmission frequency is based at least in part on the data associated with the one or more first UEs.

In an additional aspect of the disclosure, a UE may include one or more memories, one or more transceivers, and one or more processor in communication with the one or more memories and the one or more transceivers, the one or more memories storing instructions that are executable by the one or more processors, individually or in any combination, to cause the UE to perform transmitting, to a network unit, activity information associated with the UE, receiving, from the network unit, an indication of a transmission frequency for transmitting a notification, wherein the transmission frequency is based at least in part on the activity information associated with the UE, and transmitting the notification based on the transmission frequency.

In an additional aspect of the disclosure, a first wireless communication device may include one or more memories, one or more transceivers, and one or more processor in communication with the one or more memories and the one or more transceivers, the one or more memories storing instructions that are executable by the one or more processors, individually or in any combination, to cause the first wireless communication device to perform receiving, from one or more first UEs and one or more second wireless communication devices, data associated with the one or more first UEs, and sending, to the one or more first UEs, an indication of a transmission frequency for transmitting a notification, wherein the transmission frequency is based at least in part on the data associated with the one or more first UEs.

In an addition aspect of the disclosure, a computer device may include a frequency determining module configured to transmit, to a network unit, activity information associated with the UE, receive, from the network unit, an indication of a transmission frequency for transmitting a notification, wherein the transmission frequency is based at least in part on the activity information associated with the UE, and transmit the notification based on the transmission frequency.

In an addition aspect of the disclosure, a computer device may include a frequency determining module configured to receive, from one or more first UEs and one or more second wireless communication devices, data associated with the one or more first UEs, and send, to the one or more first UEs, an indication of a transmission frequency for transmitting a notification, wherein the transmission frequency is based at least in part on the data associated with the one or more first UEs.

In an additional aspect of the disclosure, a non-transitory computer-readable medium may include instructions which, when executed, cause a computer device to perform operations comprising transmitting, to a network unit, activity information associated with the UE, receiving, from the network unit, an indication of a transmission frequency for transmitting a notification, wherein the transmission frequency is based at least in part on the activity information associated with the UE, and transmitting the notification based on the transmission frequency.

In an additional aspect of the disclosure, a non-transitory computer-readable medium may include instructions which, when executed, cause a computer device to perform operations comprising receiving, from one or more first UEs and one or more second wireless communication devices, data associated with the one or more first UEs, and sending, to the one or more first UEs, an indication of a transmission frequency for transmitting a notification, wherein the transmission frequency is based at least in part on the data associated with the one or more first UEs.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention may include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances may be implemented in various devices, systems, and methods.

DETAILED DESCRIPTION

Figure 1:
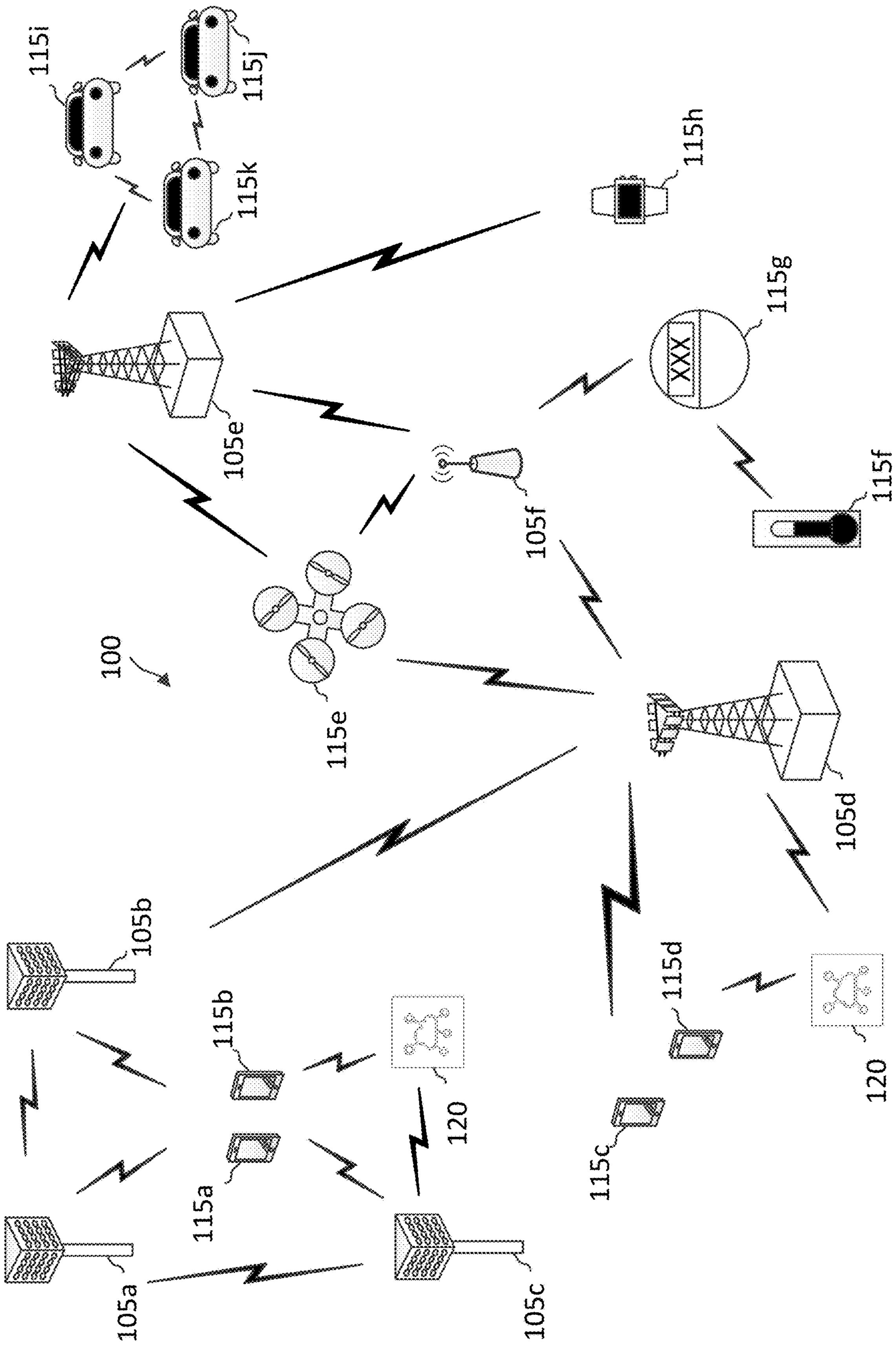
FIG. 1 illustrates an example wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

A significant increase in injuries and deaths involving vulnerable road users (VRUs) has been observed in the last several years. In addition, certain locations are more prone to such incidents than other locations. To address the aforementioned issues, a UE held by a VRU may transmit/broadcast a safety message (e.g., a personal safety message (PSM) or a vulnerable road user (VRU) awareness message (VAM)) to units (e.g., a C-V2X capable vehicle) nearby to reduce potential accident occurrences. Currently defined safety messages (e.g., PSM, VAM, etc.) modulate the message transmission frequency based on the speed of the UE held by the VRU. Modulation of the transmission frequency based on other criteria, such as the VRU motion status, or surrounding environmental conditions (e.g., lighting conditions, presence/absence of a sidewalk, etc.) is absent from the currently defined safety messages, potentially leading to untimely receipt of messages and inefficient battery utilization.

In accordance with the present disclosure, the transmission frequency for transmitting the safety message may be changed based on static environmental conditions (e.g., a presence of protected/unprotected bike lanes or sidewalks, etc.), dynamic environmental conditions (e.g., a number of surrounding vehicles, lighting/visibility conditions, etc.), and/or location-specific and/or type-specific historical conditions (e.g., roadway/intersection propensity for VRU-involved accidents). In order to provide a dynamic adjustment for the transmission frequency for the UE to transmit the safety message, the present application provides techniques for determining the transmission frequency dynamically based on data associated with VRU UEs.

Various aspects of the present disclosure relate generally to wireless communication and more particularly to wireless communications among VRU UEs, on-board units (OBUs), a network server, and/or service servers. Some aspects more specifically relate to a wireless communication between the VRU UE and the network server. The VRU UE may transmit, to the network unit, activity information associated with the UE, receive, from the network unit, an indication of a transmission frequency for transmitting a notification (e.g., the safety message), and transmit the notification based on the transmission frequency. The network server may adjust the transmission frequency based at least in part on the activity information associated with the VRU UE and/or data associated with the VRU UE. The activity information and/or the data associated with the VRU UE may be provided by the VRU UE itself, a third cloud-based entity (e.g., a weather forecast application, a traffic application, etc.), a service server (e.g., a database storing historical traffic records), and/or a nearby unit (e.g., a roadside unit, a C-V2X capable vehicle, another UE, etc.).

The VRU UE may transmit safety messages using different transmission frequencies in response to dynamically changing environmental conditions and/or the dynamic status of the VRU UE. The present disclosure provides methods and protocols for a network-based/cloud-based entity to determine and update the transmission frequency for safety messages for an individual UE or a group of UEs. The determination of the transmission frequency for the safety messages may be based on the type of VRU, a location of VRU UE, dynamic environmental conditions (e.g., weather, lighting, a number of surrounding vehicles, lighting/visibility conditions, etc.), static environmental conditions (e.g., a presence of protected/unprotected bike lanes or sidewalks, etc.), location-specific and/or type-specific historical conditions (e.g., roadway/intersection propensity for VRU-involved accidents), and/or a VRU-related accident history. One or more modules and/or components to perform the method(s) and/or protocol(s) may reside in an RSU, a gNB, and/or a cloud-based entity, and communicate the determined transmission frequency direction to the VRU UE(s) in dedicated or common signaling over a Uu message and/or a PC5 message.

Particular aspects of the subject matter described in this disclosure may be implemented to realize one or more of the following potential advantages. In some examples, by implementing wireless communication procedures according to aspects of the present disclosure, the described techniques may be used to improve the power utilization of UE through dynamically adjusting transmission frequency for transmitting a safety message, because the transmission frequency is being selected based on personalized and localized information, such that interference/collisions in transmission are reduced and, therefore, the UE may utilize a lower transmit power for the safety messages. Furthermore, the described techniques may reduce accidents for VRUs who carry a C-V2X capable UE. For example, the UE may broadcast a safety message using dynamically adjusted transmission frequency, which is determined by a network unit based on static conditions (e.g., being located in a unprotected sidewalk) and/or dynamic conditions (e.g., entering a busy area with a construction site), such that the UE may timely inform the surrounding units (e.g., other VRU UEs, RSUs, and/or C-V2X capable vehicles) with its presence and status.

FIG. 1 illustrates a wireless communication network 100, according to some aspects of the present disclosure. The network 100 includes a number of base stations (BSs) 105 and other network entities. In some aspects, a BS 105 may be interchangeable with a network node, and not limited to base stations. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs **105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105** may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 may be dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs **115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The IoT devices may include one or more sensors and be configured for communication with a BS 105 and/or a UE 115. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between devices. For example, a lightning bolt mat indicate wireless transmissions between a UE 115** and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a vehicle (e.g., a car, a truck, a bus, an autonomous vehicle, an aircraft, a boat, etc.). Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), the UE 115*h* (e.g., wearable device) may communicate through the network 100 either directly with BSs, such as the small cell BS 105*f*, and the macro BSs 105*d* and 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. In some aspects, the UE 115*h* may harvest energy from an ambient environment associated with the UE 115*h*. The network 100 may also provide additional network efficiency through dynamic, low-latency TDD/FDD communications, such as vehicle-to-vehicle (V2V), vehicle-to-everything (V2X), C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes, for example, about 10. Each subframe may be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 may perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 may enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, IAB node, a relay node, a sidelink node, etc.

In some aspects, a UE 115 may transmit, to a network unit, activity information associated with the UE 115. The UE 115 may receive, from the network unit, an indication of a transmission frequency for transmitting a notification. The transmission frequency may be based at least in part on the activity information associated with the UE 115. The UE 115 may transmit the notification based on the transmission frequency.

In some aspects, a first wireless communication device (e.g., a BS 105, and/or another UE 115, such as a roadside unit) may receive, from one or more UEs 115 and one or more second wireless communication devices (e.g., another BS 105, yet another UE 115, a network unit, and/or a cloud-based entity), data associated with the one or more UEs 115. The first wireless communication device may send, to the one or more UEs 115, an indication of a transmission frequency for transmitting a notification. The transmission frequency may be based at least in part on the data associated with the one or more UEs 115.

In some aspects, a first wireless communication device 105 may receive, from one or more UEs 115 and one or more second wireless communication devices 105, data associated with the one or more UEs 115. The first wireless communication device 105 may send, to the one or more UEs 115, an indication of a transmission frequency for transmitting a notification. The transmission frequency may be based at least in part on the data associated with the one or more UEs 115.

Figure 2:
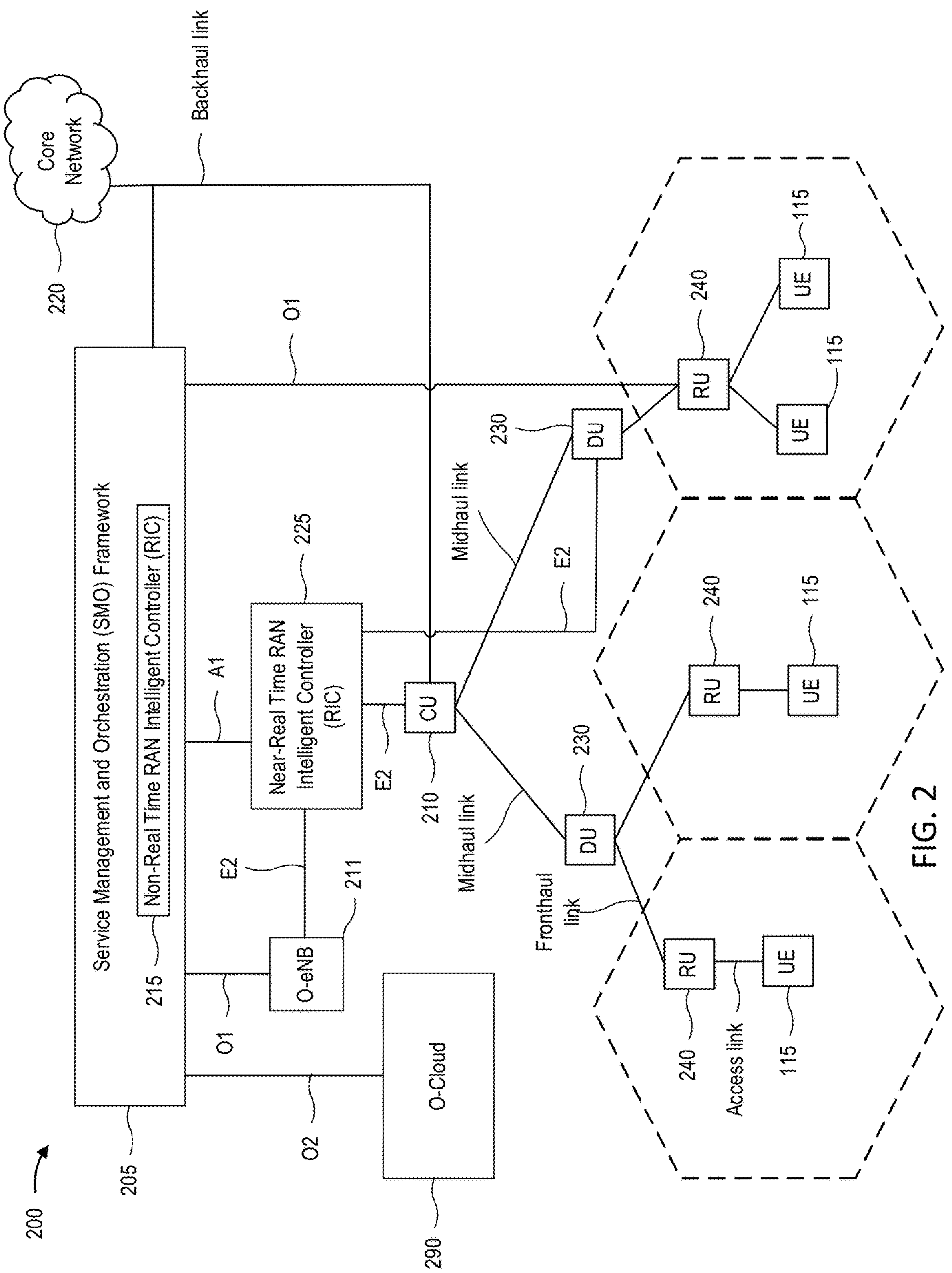
FIG. 2 illustrates an example disaggregated base station architecture according to some aspects of the present disclosure.

FIG. 2 shows a diagram illustrating an example disaggregated base station 200 architecture. The disaggregated base station 200 architecture may include one or more central units (CUs) 210 that may communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 (e.g., the UEs 115*a*-115*j*) via one or more radio frequency (RF) access links. In some implementations, the UE 115 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 may be logically split into one or more CU-UP units and one or more CU-CP units. The CU-UP unit may communicate bidirectionally with the CU-CP unit via an interface, such as the E1 interface when implemented in an O-RAN configuration. The CU 210 may be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) may be implemented with an interface configured to communicate signals with other layers (and modules) hosted by the DU 230, or with the control functions hosted by the CU 210.

Lower-layer functionality may be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 may be implemented to handle over the air (OTA) communication with one or more UEs 115. In some implementations, real-time and non-real-time aspects of control and user plane communication with the RU(s) 240 may be controlled by the corresponding DU 230. In some scenarios, this configuration may enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements may include CUs 210, DUs 230, RUs 240 and Near-RT RICs 225. In some implementations, the SMO Framework 205 may communicate with a hardware aspect of a 4G RAN, such as an open eNB (O-eNB) 211, via an O1 interface. Additionally, in some implementations, the SMO Framework 205 may communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

In some aspects, a UE 115 may transmit, to a RU 240, activity information associated with the UE 115. The UE 115 may receive, from the RU 240, an indication of a transmission frequency for transmitting a notification. The transmission frequency may be based at least in part on the activity information associated with the UE 115. The UE 115 may transmit the notification based on the transmission frequency.

In some aspects, a first RU 240 may receive, from one or more first UEs 115 and one or more second RUs 240, data associated with the one or more first UEs 115. The first RU 240 may send, to the one or more first UEs 115, an indication on of a transmission frequency for transmitting a notification. The transmission frequency may be based at least in part on the data associated with the one or more first UEs 115.

Figure 3:
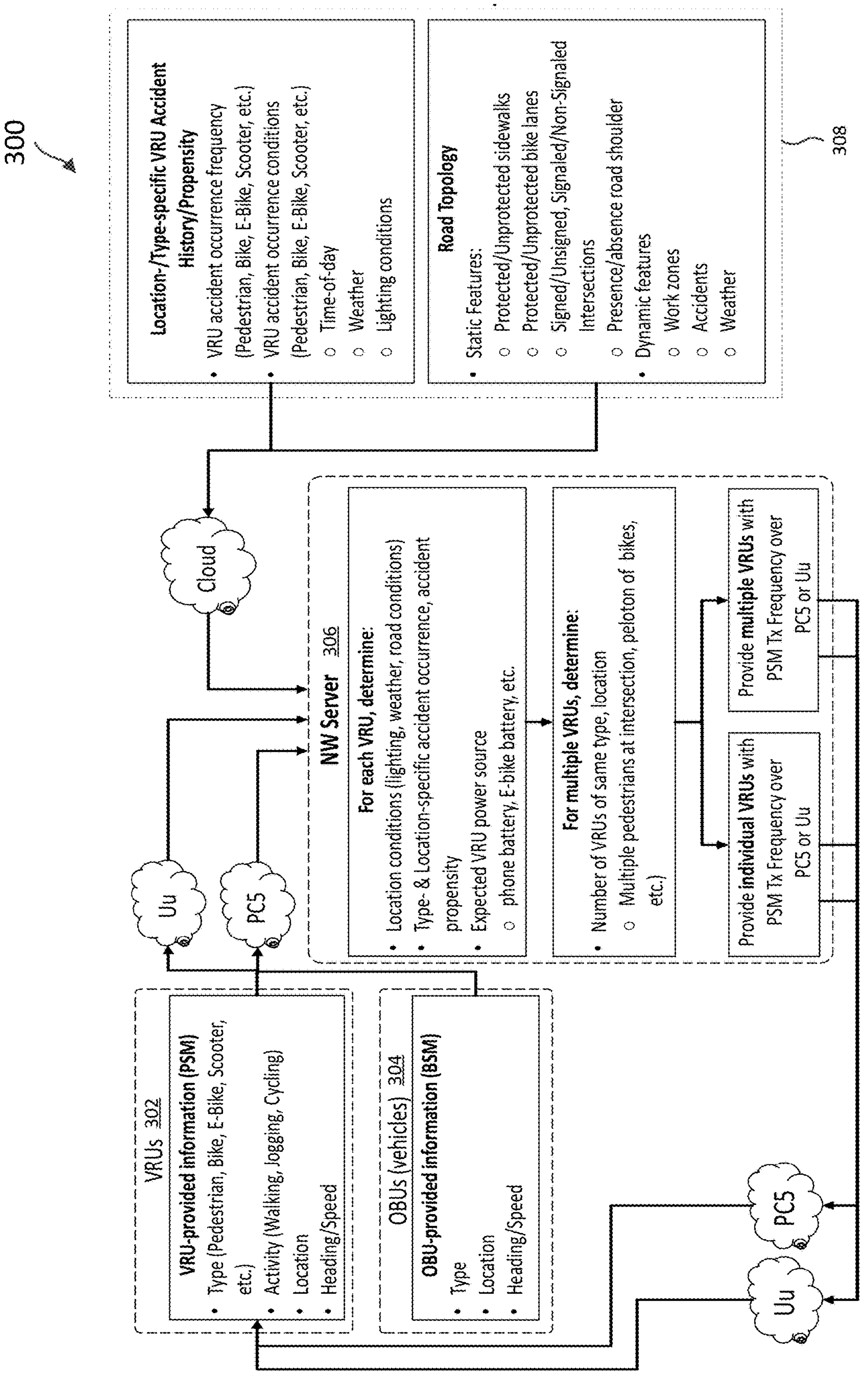
FIG. 3 illustrates an example wireless communication between among a VRU UE, an on-board unit, a network server, and a service server, according to some aspects of the present disclosure.

FIG. 3 illustrates an example of wireless communication 300 among VRU UEs 302, OBUs 304, a network server 306, and a service server 308, according to some aspects of the present disclosure. A wireless communication network 300 includes one or more VRU UEs 302, one or more OBUs 304, at least one network server 306, and one or more service servers 308. In some aspects, an OBU may be a device used to transmit and collect data for various applications. More specifically, an OBU may be an electronic device installed in a vehicle that may record local traffic and driving data, and connect to a roadside unit/system (e.g., a network server 306 in FIG. 3), and/or a satellite navigation system. In some aspects, the network server 306 may be a network unit, including a BS, a CU, a DU, and/or a RU that communicates with the VRU UE (e.g., the UE 115 discussed in FIGS. 1 and 2 that is carried by a VRU). More specifically, the network server 306 may be the BS 105, the CU 210, the DU 230, the RU 240 and/or a network unit 1000 described in FIG. 1-2, or 10. In some aspects, the network server 306 may be a cloud-based server. In some aspects, the service server 306 may be a server that provides a specific service, e.g., a weather report, a road topology information, and/or a historical VRU-related report.

As discussed above, the network server 306 may receive data from the VRU UE(s) 302, the OBU(s) 304, and/or the service server(s) 308 for determining a transmission frequency for the VRU UE(s) 302. In some aspects, the VRU UE(s) 302 may provide safety-related data (e.g., data associated with a personal safety message (PSM) and/or a VRU awareness message (VAM)), including a type of the VRU (e.g., a pedestrian, a bike, an e-bike, a scooter, etc.), an activity of the VRU (e.g., walking, jogging, cycling, etc.), a location of the VRU UE(s) 302, and/or a heading direction/speed of the VRU UE(s) 302. In some aspects, the OBU(s) 304 may provide blind spot monitor (BSM)-related data, including a type of vehicle, a location of vehicle, and a heading direction/speed of vehicle. In some aspects, the VRU UE(s) 302 and the OBU(s) 304 may transmit data over a Uu message or a PC5 message (e.g., a PC5-Radio Resource Control (RRC) message, or a PC5 Signaling (PC5-S) message). In some aspects, the service server 308 may provide a location-specific VRU accident history, a type-specific VRU accident history, and a road topology information. The location-specific VRU accident history may include VRU accident occurrence conditions, including time-of-day, weather, and lighting conditions. For example, the location-specific VRU accident history may indicate that a VRU accident may have a higher chance to happen during night time in this area. The type-specific VRU accident history may include VRU accident occurrence frequency, such as accident occurrence frequency for a pedestrian, accident occurrence frequency for a bike, accident occurrence frequency for an e-Bike, accident occurrence frequency for a scooter, etc. The road topology information may include static features and dynamic features of road. For example, the static features of road may indicate whether this road includes a protected/unprotected sidewalk, a protected/unprotected bike lane, a signed/unsigned intersection, a signaled/non-signaled intersection, and/or a road shoulder. The dynamic features of road may indicate whether this road (including nearby area) currently (including near future) has a work zone, an accident, and/or a hazard weather.

The network server 306 may determine the transmission frequency for the VRU UE(s) 302 based on the data received from the VRU UE(s) 302, the OBU(s) 304, and/or the service server(s) 308 as discussed above. In one aspect for determining the transmission frequency for a single VRU UE 302, the network server 306 may identify location conditions (e.g., lighting, weather, and/or road conditions), a location-specific accident occurrence, a type-specific accident occurrence, an accident propensity, and an expected power source (e.g., cell phone battery, e-bike battery, etc.) for the VRU UE 302 based on the received data, and determine the transmission frequency for the VRU UE 302 based on the identified conditions associated with the VRU UE 302. In another aspect for determining a transmission frequency for multiple VRU UEs 302, the network server 306 may identify a number of VRU UEs 302 for each type of VRU (e.g., the number of pedestrian VRU UEs, the number of jogger VRU UEs, the number of bike VRU UEs, etc.), same type, and a location of VRU UEs 302 (e.g., a group of pedestrians at an intersection, a peloton of bikes cruising down the road, etc.) based on the received data, and determine a transmission frequency for the VRU UEs 302 based on the identified conditions.

The network server 306 may then provide the determined transmission frequency to the single VRU UE 302 or the multiple VRU UEs 302 individually in response to a corresponding determination of the transmission frequency (e.g., a determination of the transmission frequency for a single VRU UE or a group of VRU UEs). In some aspects, the network server 306 may send the transmission frequency to an individual VRU UE 302 and/or multiple VRU UEs 302 over a Uu message or a PC5 message (e.g., a PC5-RRC message, or a PC5-S message). In some aspects, an exemplary PC5-RRC IE, dedicated message may be transmitted using UE-PSMTxFreqSidelink (dedicated signaling), and the field descriptions of UE-PSMTxFreqSidelink may be PSM-TxFrequency stating "Frequency for PSM sidelink transmission in Hz. Value 1=1 Hz, Value 2=2 Hz, and so on." In some aspects, PSM-TxFrequency may be added to an existing PC5-RRC message. In some aspects, PSM-TxFrequency may be part of a PC5-S message via unicast, groupcast or broadcast. In some aspects, in an exemplary cell-wide configuration via common signaling (e.g., System Information Block Type 12 (SIB12)), PSM-TxFrequency may be added as a new information element (e.g., proposed NR RRC definitions).

Examples of the network server 306 dynamically determining a transmission frequency for the VRU UE(s) 302 will be further described in FIGS. 4-7.

Figure 4:
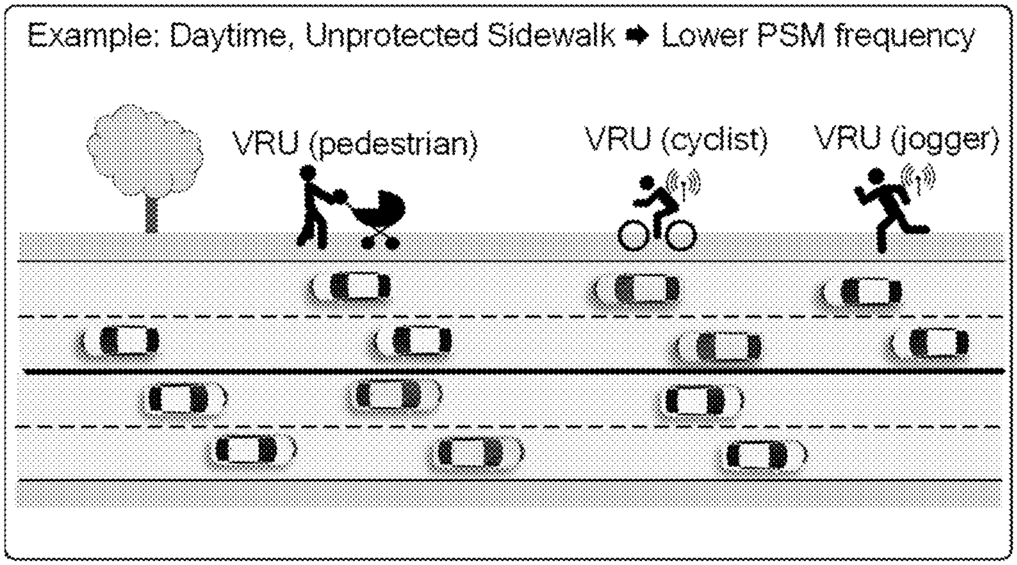
FIG. 4 is a diagram illustrating an exemplary scenario in determining a transmission frequency, according to some aspects of the present disclosure.

FIG. 4 is a diagram illustrating an exemplary scenario 400 in determining a transmission frequency, according to some aspects of the present disclosure. Aspects of determining the transmission frequency discussed in the scenario 400 may be executed by a computing device (e.g., a processor, processing circuit, and/or other suitable component) of a communication device or other suitable means for performing the actions. For example, a communication device, such as a network unit 105 may utilize one or more components, such as the processor 1002, the memory 1004, the frequency determining module 1008, the transceiver 1010, the modem 1012, and the one or more antennas 1016, to execute aspects of determining the transmission frequency in the scenario 400. A method of determining the transmission frequency discussed in the scenario 400 may employ similar mechanisms as in the networks 100 and 200 and the aspects and actions described with respect to FIG. 3.

The network unit 105 may determine the transmission frequency based on conditions provided in the scenario 400. For example, the network unit 105 may identify the type of VRUs (e.g., a pedestrian, a cyclist, and a jogger), the time of day (e.g., daytime), and road design (e.g., an unprotected sidewalk) based on data received from VRU UEs held by the VRUs, a service server (e.g., a server storing historical records of VRU accidents and road design in the area where the VRU UEs locate), and/or OBUs (e.g., an OBU-installed vehicle). The network unit 105 may determine a lower transmission frequency for the VRU UEs to broadcast the safety message, in response to the conditions provided in the scenario 400.

Figure 5:
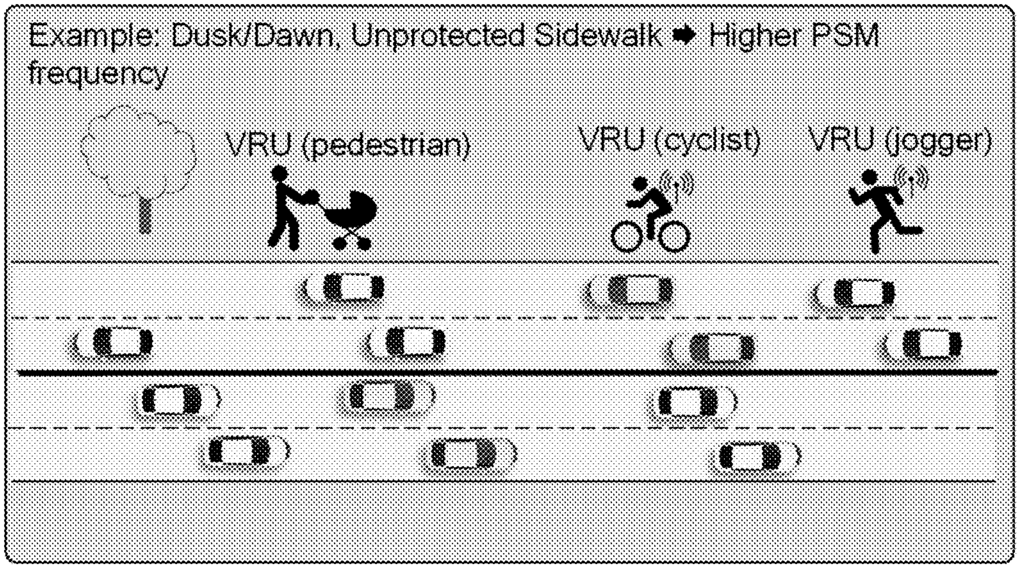
FIG. 5 is a diagram illustrating an exemplary scenario in determining a transmission frequency, according to some aspects of the present disclosure.

FIG. 5 is a diagram illustrating an exemplary scenario 500 in determining a transmission frequency, according to some aspects of the present disclosure. Aspects of determining the transmission frequency discussed in the scenario 500 may be executed by a computing device (e.g., a processor, processing circuit, and/or other suitable component) of a communication device or other suitable means for performing the actions. For example, a communication device, such as a network unit 105 may utilize one or more components, such as the processor 1002, the memory 1004, the frequency determining module 1008, the transceiver 1010, the modem 1012, and the one or more antennas 1016, to execute aspects of determining the transmission frequency discussed in the scenario 500. A method of determining the transmission frequency in the scenario 500 may employ similar mechanisms as in the networks 100 and 200 and the aspects and actions described with respect to FIG. 3.

The network unit 105 may determine the transmission frequency based on conditions provided in the scenario 500. For example, the network unit 105 may identify the type of VRUs (e.g., a pedestrian, a cyclist, and a jogger), the time of day (e.g., dawn/dusk time), and road design (e.g., an unprotected sidewalk) based on data received from VRU UEs held by the VRUs, a service server (e.g., a server storing historical records of VRU accidents and road design in the area where the VRU UEs locate), and/or OBUs (e.g., an OBU-installed vehicle). The network unit 105 may determine a higher transmission frequency for the VRU UEs to broadcast the safety message, in response to the conditions provided in the scenario 500.

Figure 6:
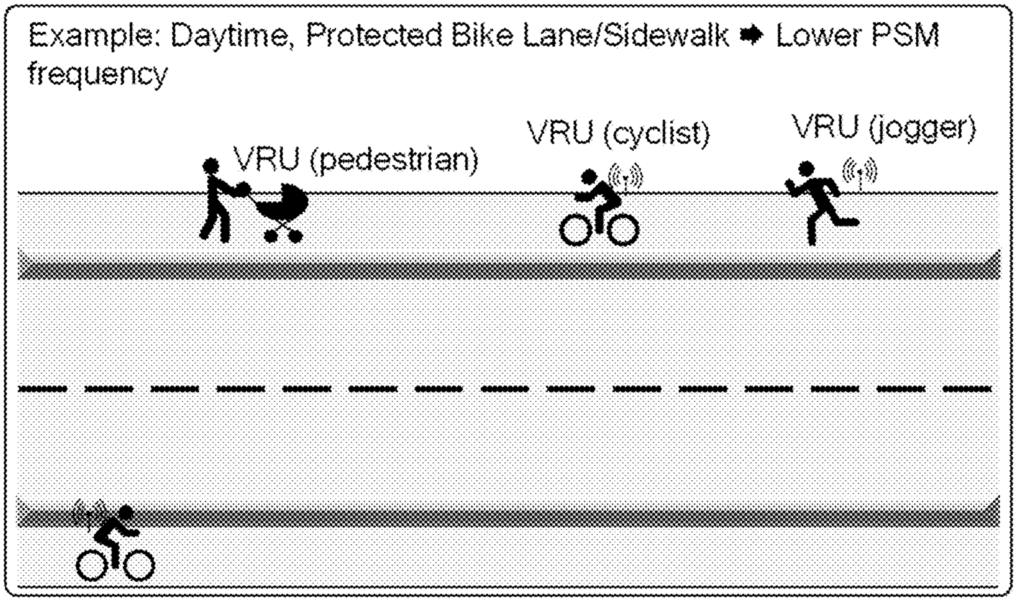
FIG. 6 is a diagram illustrating an exemplary scenario in determining a transmission frequency, according to some aspects of the present disclosure.

FIG. 6 is a diagram illustrating an exemplary scenario 600 in determining a transmission frequency, according to some aspects of the present disclosure. Aspects of determining the transmission frequency discussed in the scenario 600 may be executed by a computing device (e.g., a processor, processing circuit, and/or other suitable component) of a communication device or other suitable means for performing the actions. For example, a communication device, such as a network unit 105 may utilize one or more components, such as the processor 1002, the memory 1004, the frequency determining module 1008, the transceiver 1010, the modem 1012, and the one or more antennas 1016, to execute aspects of determining the transmission frequency in the scenario 600. A method of determining the transmission frequency discussed in the scenario 600 may employ similar mechanisms as in the networks 100 and 200 and the aspects and actions described with respect to FIG. 3.

The network unit 105 may determine the transmission frequency based on conditions provided in the scenario 600. For example, the network unit 105 may identify the type of VRUs (e.g., a pedestrian, a cyclist, and a jogger), the time of day (e.g., daytime), and road design (e.g., a protected sidewalk/bike lane) based on data received from VRU UEs held by the VRUs, and/or a service server (e.g., a server storing historical records of VRU accidents and road design in the area where the VRU UEs locate). The network unit 105 may determine a lower transmission frequency for the VRU UEs to broadcast the safety message, in response to the conditions provided in the scenario 600.

Figure 7:
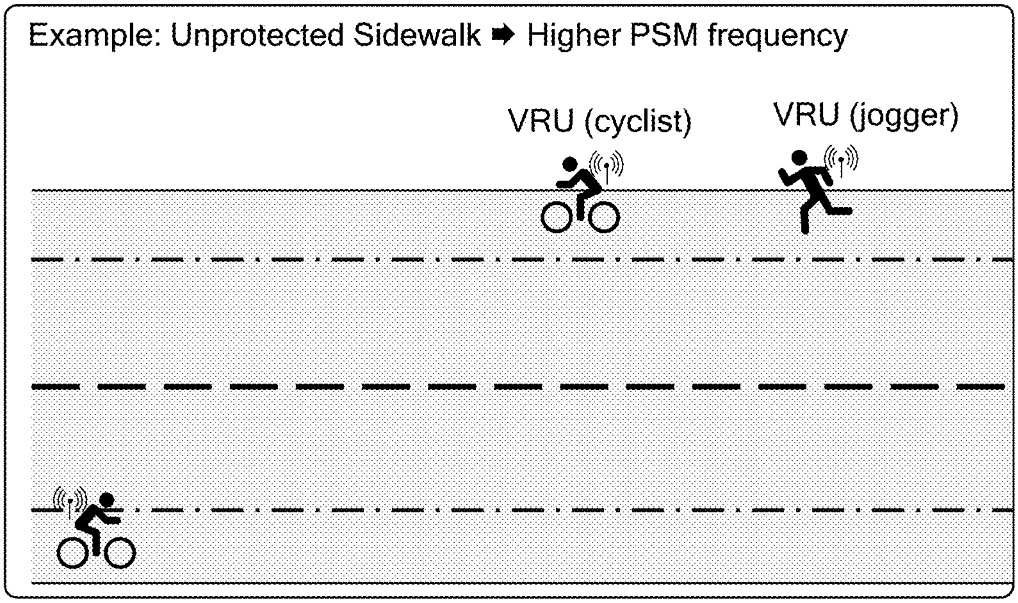
FIG. 7 is a diagram illustrating an exemplary scenario in determining a transmission frequency, according to some aspects of the present disclosure.

FIG. 7 is a diagram illustrating an exemplary scenario 700 in determining a transmission frequency, according to some aspects of the present disclosure. Aspects of determining the transmission frequency discussed in the scenario 700 may be executed by a computing device (e.g., a processor, processing circuit, and/or other suitable component) of a communication device or other suitable means for performing the actions. For example, a communication device, such as a network unit 105 may utilize one or more components, such as the processor 1002, the memory 1004, the frequency determining module 1008, the transceiver 1010, the modem 1012, and the one or more antennas 1016, to execute aspects of determining the transmission frequency discussed in the scenario 700. A method of determining the transmission frequency discussed in the scenario 700 may employ similar mechanisms as in the networks 100 and 200 and the aspects and actions described with respect to FIG. 3.

The network unit 105 may determine the transmission frequency based on conditions provided in the scenario 700. For example, the network unit 105 may identify the type of VRUs (e.g., a cyclist and a jogger), and road design (e.g., an unprotected sidewalk) based on data received from VRU UEs held by the VRUs, and/or a service server (e.g., a server storing historical records of VRU accidents and road design in the area where the VRU UEs locate). The network unit 105 may determine a higher transmission frequency for the VRU UEs to broadcast the safety message, in response to the conditions provided in the scenario 700.

Figure 8:
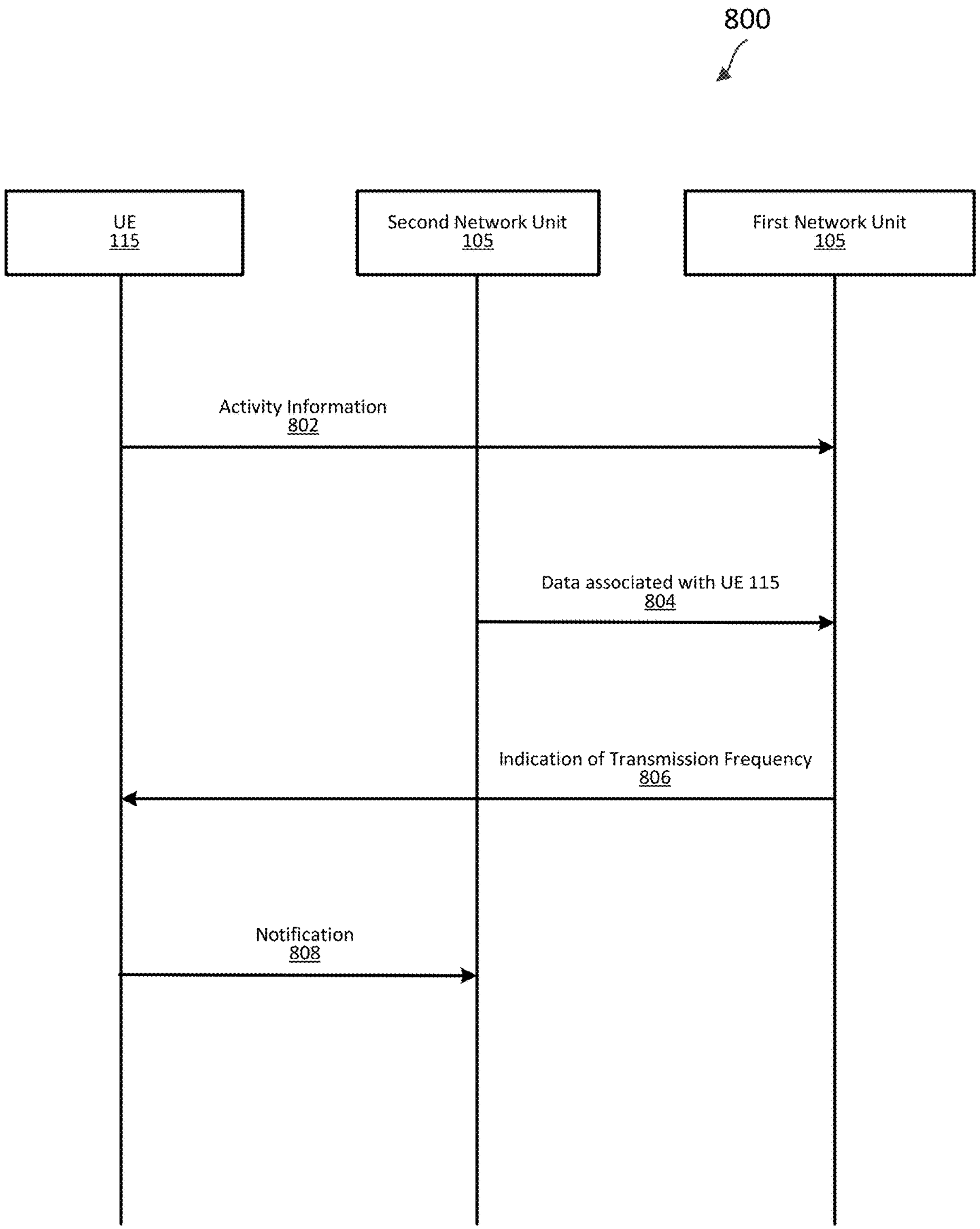
FIG. 8 is a signal flow diagram of an exemplary communication method according to some aspects of the present disclosure.

FIG. 8 is a flow diagram of a communication method 800 according to some aspects of the present disclosure. Aspects of the method 800 may be executed by a computing device (e.g., a processor, processing circuit, and/or other suitable component) of a communication device or other suitable means for performing the actions. For example, a wireless communication device, such as the UE 115 or the UE 900, may utilize one or more components, such as the processor 902, the memory 904, the frequency determining module 908, the transceiver 910, the modem 912, and the one or more antennas 916, to execute aspects of method 800. The method 800 may employ similar mechanisms as in the networks 100 and 200. For example, a communication device, such as the network unit 105, may utilize one or more components, such as the processor 1002, the memory 1004, the frequency determining module 1008, the transceiver 1010, the modem 1012, and the one or more antennas 1016, to execute aspects of method 800. As illustrated, the method 800 includes a number of enumerated actions, but the method 800 may include additional actions before, after, and in between the enumerated actions. In some aspects, one or more of the enumerated actions may be omitted or performed in a different order.

At action 802, the UE 115 may send activity information associated with the UE 115 to a first network unit 105 (e.g., the BS 105, the RU 240, the DU 230, the CU 210, and/or a network server). In some aspects, the activity information associated with the UE 115 may include at least one of a type of a user associated with the UE 115, an activity of the user associated with the UE 115, a location of the UE 115, a direction of movement of the UE 115, or a speed of movement of the UE 115. For example, the activity information associated with the UE 115 may indicate that the UE 115 may be a VRU UE based at least part on the type of the user associated with the UE 115 (e.g., a pedestrian carrying a UE 115), the activity of the user associated with the UE 115 (e.g., a user jogging with a UE 115), a location of the UE 115 (e.g., a unprotected sidewalk), the direction of movement of the UE 115 (e.g., a direction heading to a heavy-traffic area), and the speed of movement of the UE 115 (e.g., a cycling speed of the user carrying the UE 115). In some aspects, multiple UEs 115 may send their activity information to the first network unit 105 for the first network unit 105 to analyze a transmission frequency for broadcasting a notification.

At action 804, a second network unit 105 (e.g., the BS 105, the RU 240, the DU 230, and/or the CU 210) may send data associated with the UE 115 to the first network unit 105. For example, the second network unit 105 may be multiple network units, including an OBU (e.g., an OBU-installed vehicle), another UE 115, a roadside unit, and/or a service server (e.g., a weather service provider), to provide the data associated with the UE 115 (e.g., the local weather in the location of the UE 115) for the first network unit 105 to analyze the transmission frequency for the UE 115 to broadcast the notification.

At action 806, the first network unit 105 may send an indication of transmission frequency for broadcasting the notification to the UE 115. As discussed, the first network unit 105 receives the activity information associated with the UE 115 from the UE 115 and the data associated with the UE 115 from the second network unit(s) 105, and determines a transmission frequency for the UE 115 to broadcast the notification based at least part on the activity information associated with the UE 115 and the data associated with the UE 115. For example, the first network unit 105 may determine a relatively low transmission frequency for the UE 115 when the UE 115 is located in an environment with a protected sidewalk (e.g., a static feature of road design information sent from a roadside unit close to the UE 115), and then send the determined transmission frequency to the UE 155.

At action 808, the UE 115 may broadcast the notification based on the transmission frequency to wireless communication device nearby (e.g., the second network unit 105 as an example shown in FIG. 8). For example, the UE 115 may broadcast the notification to the second network unit 105 (e.g., a C-V2X capable vehicle) near the UE 115, such that a user associated the second network unit 105 (e.g., the driver of the C-V2X capable vehicle) may stay alert when the user carrying the UE 115 is approaching.

Figure 9:
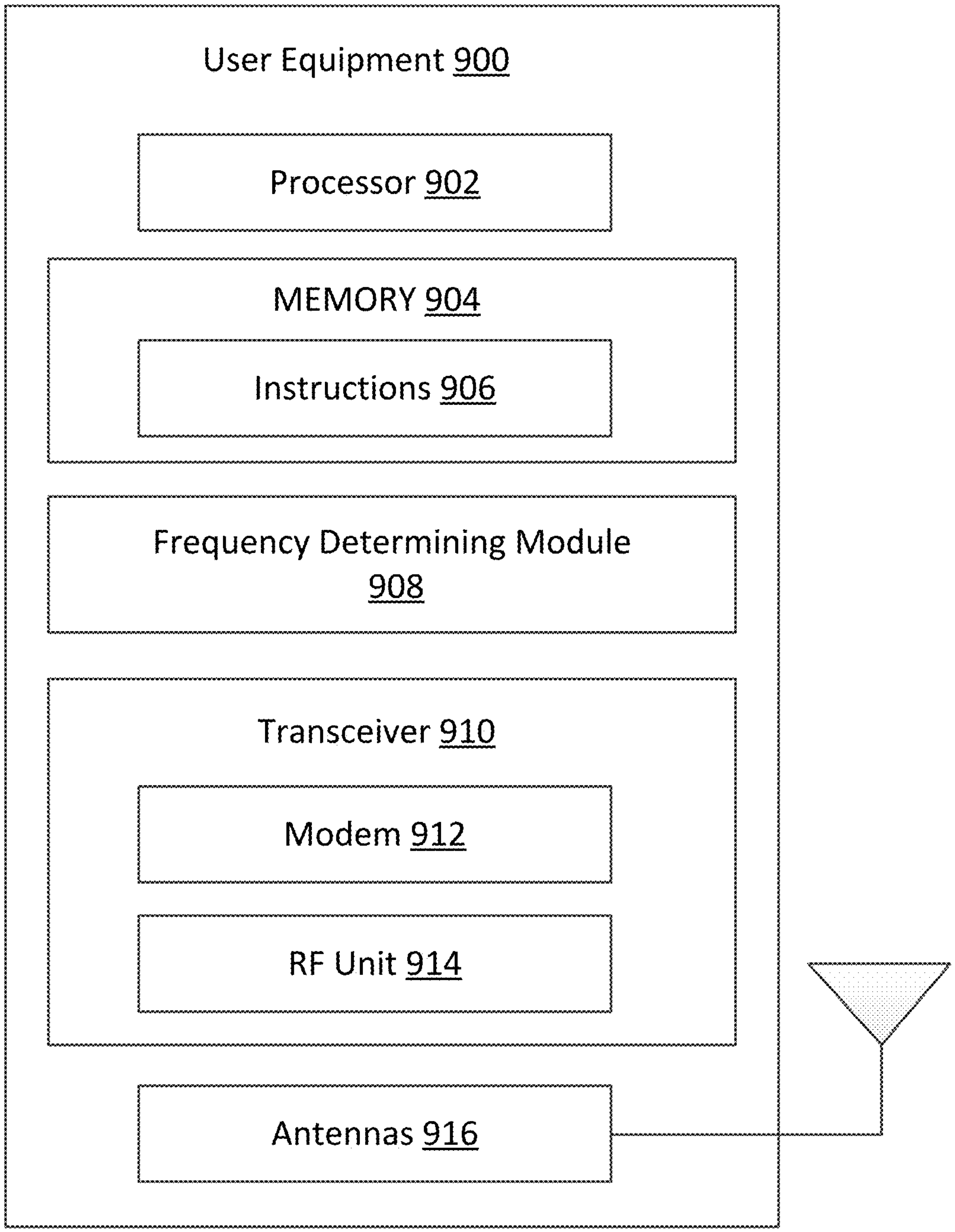
FIG. 9 is a block diagram of an exemplary user equipment according to some aspects of the present disclosure.

FIG. 9 is a block diagram of an exemplary UE 900 according to some aspects of the present disclosure. The UE 900 may be the UE 115 in the network 100, or 200 as discussed above. As shown, the UE 900 may include a processor 902, a memory 904, a frequency determining module 908, a transceiver 910 including a modem subsystem 912 and a radio frequency (RF) unit 914, and one or more antennas 916. These elements may be coupled with each other and in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 904 includes a non-transitory computer-readable medium. The memory 904 may store instructions 906. The instructions 906 may include instructions that, when executed by the processor 902, cause the processor 902 to perform the operations described herein with reference to the UEs 115 in connection with aspects of the present disclosure, for example, aspects of FIGS. 3-8. Instructions 906 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The frequency determining module 908 may be implemented via hardware, software, or combinations thereof. For example, the frequency determining module 908 may be implemented as a processor, circuit, and/or instructions 906 stored in the memory 904 and executed by the processor 902. In some aspects, the frequency determining module 908 may implement the aspects of FIGS. 3-8. For example, the frequency determining module 908 may transmit, to a network unit (e.g., the BS 105, the CU 210, the DU 230, the RU 240, or a cloud-based server), activity information associated with the UE 900. The frequency determining module 908 may receive, from the network unit, an indication of a transmission frequency for transmitting a notification. The transmission frequency may be based at least in part on the activity information associated with the UE 900. The frequency determining module 908 may transmit the notification based on the transmission frequency.

As shown, the transceiver 910 may include the modem subsystem 912 and the RF unit 914. The transceiver 910 may be configured to communicate bi-directionally with other devices, such as the BSs 105 and/or the UEs 115. The modem subsystem 912 may be configured to modulate and/or encode the data from the memory 904 and the according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together to enable the UE 900 to communicate with other devices.

The RF unit 914 may provide the modulated and/or processed data, e.g., data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The antennas 916 may include multiple antennas of similar or different designs in order to sustain multiple transmission links. The RF unit 914 may configure the antennas 916.

In some instances, the UE 900 may include multiple transceivers 910 implementing different RATs (e.g., NR and LTE). In some instances, the UE 900 may include a single transceiver 910 implementing multiple RATs (e.g., NR and LTE). In some instances, the transceiver 910 may include various components, where different combinations of components may implement RATs.

Figure 10:
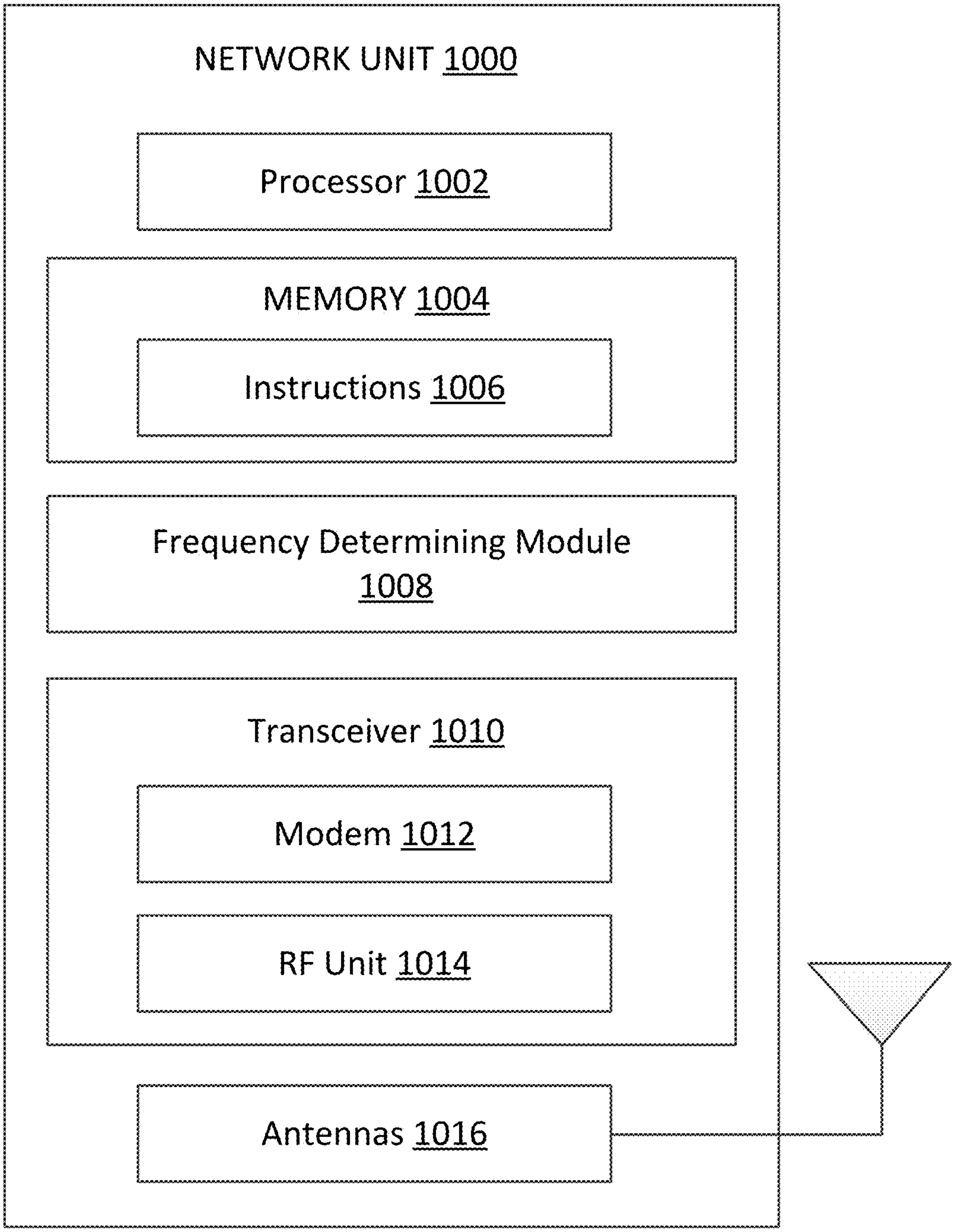
FIG. 10 is a block diagram of an exemplary network unit according to some aspects of the present disclosure.

FIG. 10 is a block diagram of an exemplary network unit 1000 according to some aspects of the present disclosure. The network unit 1000 may be the BS 105, the CU 210, the DU 230, the RU 240, or a cloud-based server as discussed above. As shown, the network unit 1000 may include a processor 1002, a memory 1004, a frequency determining module 1008, a transceiver 1010 including a modem subsystem 1012 and a RF unit 1014, and one or more antennas 1016. These elements may be coupled with each other and in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 3-8. Instructions 1006 may also be referred to as code, which may be interpreted broadly to include any type of computer-readable statement(s).

The frequency determining module 1008 may be implemented via hardware, software, or combinations thereof. For example, the frequency determining module 1008 may be implemented as a processor, circuit, and/or instructions 1006 stored in the memory 1004 and executed by the processor 1002. In some aspects, the frequency determining module 1008 may implement the aspects of FIGS. 3-8. For example, the frequency determining module 1008 may receive, from one or more first UEs 115 and one or more second wireless communication devices, data associated with the first UE(s) 115. The frequency determining module 1008 may send, to the first UE(s) 115, an indication on of a transmission frequency for transmitting a notification. The transmission frequency may be based at least in part on the data associated with the first UE(s) 115.

Additionally or alternatively, the frequency determining module 1008 may be implemented in any combination of hardware and software, and may, in some implementations, involve, for example, processor 1002, memory 1004, instructions 1006, transceiver 1010, and/or modem 1012.

As shown, the transceiver 1010 may include the modem subsystem 1012 and the RF unit 1014. The transceiver 1010 may be configured to communicate bi-directionally with other devices, such as the UEs 115 and/or UE 900. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data from the modem subsystem 1012 (on outbound transmissions) or of transmissions originating from another source such as a UE 115 or UE 900. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the network unit 1000 to enable the network unit 1000 to communicate with other devices.

The RF unit 1014 may provide the modulated and/or processed data, e.g., data packets (or, more generally, data messages that may contain one or more data packets and other information), to the antennas 1016 for transmission to one or more other devices. This may include, for example, a configuration indicating a plurality of sub-slots within a slot according to aspects of the present disclosure. The antennas 1016 may further receive data messages transmitted from other devices and provide the received data messages for processing and/or demodulation at the transceiver 1010. The antennas 1016 may include multiple antennas of similar or different designs in order to sustain multiple transmission links.

In some instances, the network unit 1000 may include multiple transceivers 1010 implementing different RATs (e.g., NR and LTE). In some instances, the network unit 1000 may include a single transceiver 1010 implementing multiple RATs (e.g., NR and LTE). In some instances, the transceiver 1010 may include various components, where different combinations of components may implement RATs.

Figure 11:
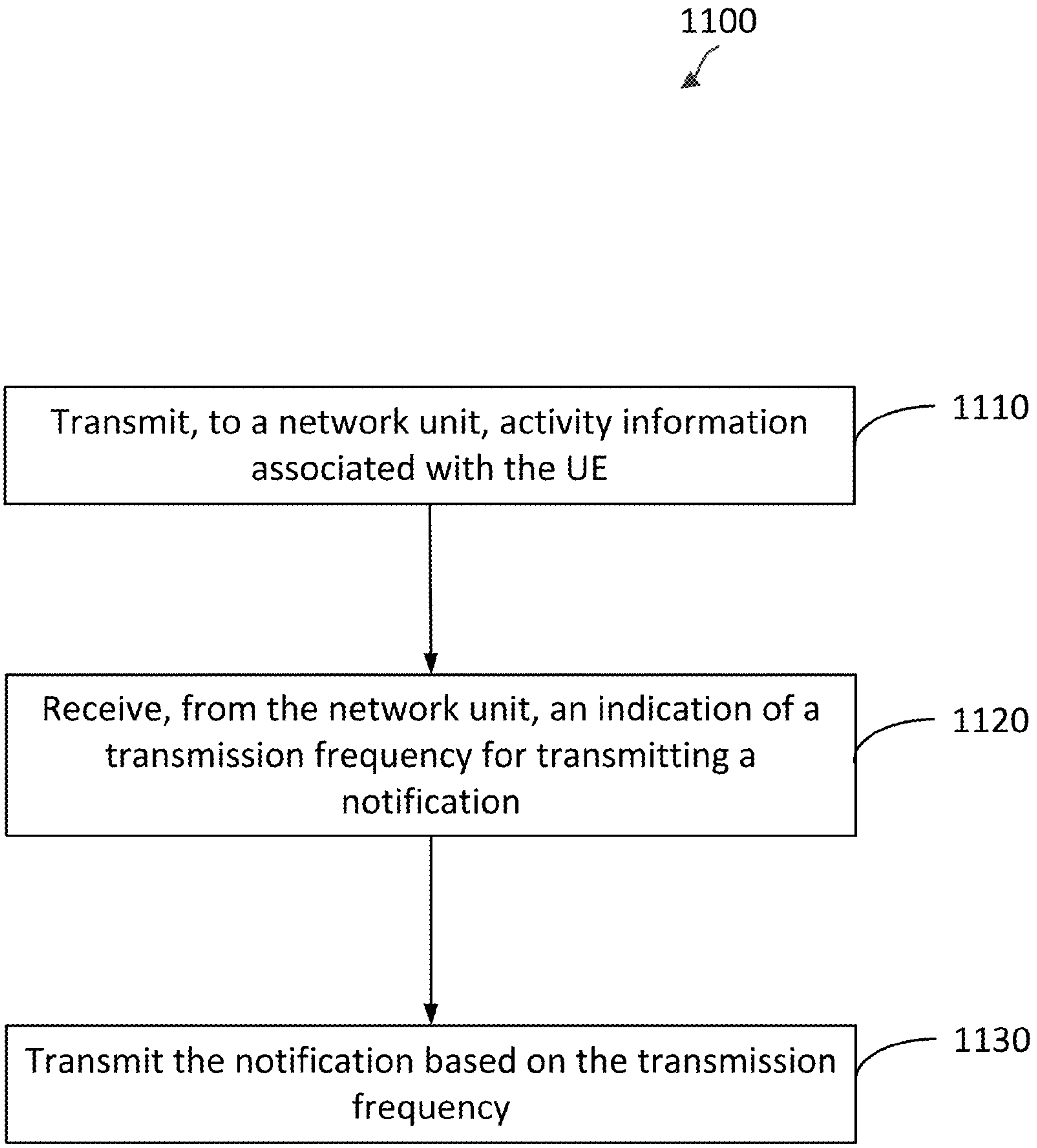
FIG. 11 is a flow diagram of a communication method according to some aspects of the present disclosure.

FIG. 11 is a flow diagram of a communication method 1100 according to some aspects of the present disclosure. Aspects of the method 1100 can be executed by a computing device (e.g., a processor, processing circuit, and/or other suitable component) of a wireless communication device or other suitable means for performing the actions. For example, a wireless communication device, such as the UE 115 or the UE 900, may utilize one or more components, such as the processor 902, the memory 904, the frequency determining module 908, the transceiver 910, the modem 912, and the one or more antennas 916, to execute aspects of method 1100. The method 1100 may employ similar mechanisms as in the networks 100 and 200 and the aspects and actions described with respect to FIGS. 3-8. As illustrated, the method 1100 includes a number of enumerated actions, but the method 1100 may include additional actions before, after, and in between the enumerated actions. In some aspects, one or more of the enumerated actions may be omitted or performed in a different order.

At action 1110, the method 1100 may include a UE 115 transmitting, to a wireless communication device (e.g., a network unit 1000, the BS 105, the RU 240, the DU 230, and/or the CU 210), activity information associated with the UE 115. In some aspects, the activity information may include at least one of a type of a user associated with the UE 115, an activity of the user associated with the UE 115, a location of the UE 115, a direction of movement of the UE 115, or a speed of movement of the UE 115. For example, the activity information may indicate that the user 115 may be a pedestrian, a jogger, or a biker (e.g., the type of the user 115 carrying the UE 115).

At action 1120, the method 1100 may include the UE 115 receiving, from the wireless communication device, an indication of a transmission frequency for transmitting a notification. The transmission frequency may be based at least in part on the activity information associated with the UE 115. In some aspects, the notification may include a safety message that includes a dynamic status of a user associated with the UE 115. The safety message may be a Personal Safety Message (PSM) defined in SAE Standards, or a VRU Awareness Message (VAM) defined in ETSI Standards. In some aspects, the dynamic status of the user associated with the UE 115 may include a location of the UE 115, a motion state of the UE 115, a path history associated with the UE 115, and a path prediction associated with the UE 115. In this regard, the UE 115 (e.g., the VRU UE) may broadcast the safety message to surrounding wireless communication devices (e.g., vehicles, roadside units (RSUs), or other VRU UEs) to raise awareness of the user. In some aspects, the indication of the transmission frequency may be received via a Uu message or a PC5 message (e.g., a PC5-RRC message, or a PC5-S message).

At action 1130, the method 1100 may include the UE 115 transmitting the notification based on the transmission frequency. In some aspects, the method 1100 may further include the UE 115 receiving, from the network unit, an indication of a second transmission frequency for transmitting the notification, and transmitting the notification based on the second transmission frequency. The second transmission frequency may be different from the transmission frequency. In this regard, the UE 115 may dynamically transmit the notification based on different transmission frequencies to surrounding wireless communication devices in response to its continuously changing activity information.

In some aspects, the method 1100 may include the UE 115 detecting an incident, and transmitting the notification based at least in part in response to the incident. The incident may include an event in proximity of a location associated with the UE 115.

Figure 12:
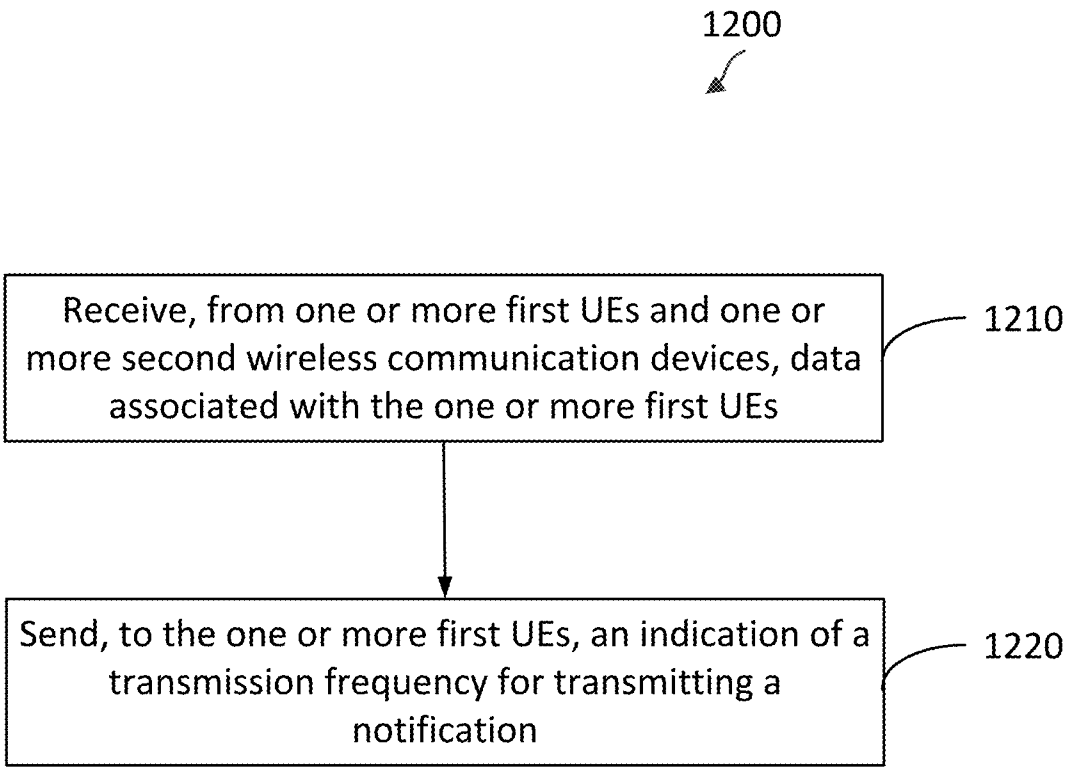
FIG. 12 is a flow diagram of a communication method according to some aspects of the present disclosure.

FIG. 12 is a flow diagram of a communication method 1200 according to some aspects of the present disclosure. Aspects of the method 1200 can be executed by a computing device (e.g., a processor, processing circuit, and/or other suitable component) of a wireless communication device or other suitable means for performing the actions. For example, a wireless communication device, such as the network unit 1000 (e.g., the BS 105, the RU 240, the DU 230, and/or the CU 210) may utilize one or more components, such as the processor 1002, the memory 1004, the frequency determining module 1008, the transceiver 1010, the modem 1012, and the one or more antennas 1016, to execute aspects of method 1200. The method 1200 may employ similar mechanisms as in the networks 100 and 200 and the aspects and actions described with respect to FIGS. 3-8. As illustrated, the method 1200 includes a number of enumerated actions, but the method 1200 may include additional actions before, after, and in between the enumerated actions. In some aspects, one or more of the enumerated actions may be omitted or performed in a different order.

At action 1210, the method 1200 may include a first wireless communication device (e.g., the network unit 1000, the BS 105, the RU 240, the DU 230, the CU 210, and/or a cloud-based server) receiving, from one or more first UEs 115 and one or more second wireless communication devices (e.g., OBU-installed vehicles, and/or RSUs), data associated with the first UE(s) 115. In some aspects, the second wireless communication device may include at least one of a second UE 115, a RSU, a dedicated short range communications (DSRC)-equipped device, or a service server.

In some aspects, the data associated with the first UE(s) 115 may include data associated with an environment in proximity of the first UE(s) 115, statistical data associated with a type of a user of the first UE(s) 115, activity information associated with the first UE(s) 115, or active information associated with the second wireless communication device(s). In some aspects, the data associated with the environment in proximity of the first UE(s) 115 may include at least one of construction information, weather information, accident information, or road design information. In some aspects, the statistical data associated with the type of the user of the first UE(s) 115 may include an accident occurrence frequency corresponding to the type of the user, and accident occurrence conditions corresponding to the type of the user. In some aspects, the activity information associated with the first UE(s) 115 may include at least one of the type of the user associated with the first UE(s) 115, an activity of the user associated with the first UE(s) 115, a location of the one or more first UEs 115, a direction of a movement of the first UE(s) 115, or a speed of the movement of the first UE(s) 115.

At action 1220, the method 1200 may include the first wireless communication device sending, to the first UE(s) 115, an indication of a transmission frequency for transmitting a notification. The transmission frequency may be based at least in part on the data associated with the first UE(s) 115. In some aspects, the method 1200 may further include the first wireless communication device receiving, from the first UE(s) 115 and the second wireless communication device(s), second data associated with the first UE(s) 115, and sending, to the first UE(s) 115, an indication of a second transmission frequency for transmitting the notification. The second transmission frequency may be based on at least in part on the second data associated with the first UE(s) 115, and the second transmission frequency is different from the transmission frequency. In this regard, the first wireless communication device may dynamically determine a transmission frequency for the first UE(s) 115 based on the data provided by the first UE(s) 115 and the second wireless communication device(s). In some aspects, the indication of the transmission frequency may be sent via a Uu message or a PC5 message (e.g., a PC5-RRC message, or a PC5-S message).

Further aspects of the present disclosure include the following:

Aspect 1 includes a method of wireless communication performed by a user equipment (UE), the method comprising transmitting, to a network unit, activity information associated with the UE, receiving, from the network unit, an indication of a transmission frequency for transmitting a notification, wherein the transmission frequency is based at least in part on the activity information associated with the UE, and transmitting the notification based on the transmission frequency.

Aspect 2 includes the method of aspect 1, further comprising receiving, from the network unit, an indication of a second transmission frequency for transmitting the notification, wherein the second transmission frequency is different from the transmission frequency, and transmitting the notification based on the second transmission frequency.

Aspect 3 includes the method of any of aspects 1-2, wherein the notification comprises a safety message that includes a dynamic status of a user associated with the UE.

Aspect 4 includes the method of any of aspects 1-3, wherein the dynamic status of the user associated with the UE comprises a location of the UE, a motion state of the UE, a path history associated with the UE, and a path prediction associated with the UE.

Aspect 5 includes the method of any of aspects 1-4, wherein the activity information comprises at least one of a type of a user associated with the UE, an activity of the user associated with the UE, a location of the UE, a direction of movement of the UE, or a speed of movement of the UE.

Aspect 6 includes the method of any of aspects 1-5, wherein the receiving the indication of the transmission frequency comprises receiving, from the network unit, the indication of the transmission frequency via a Uu message or a PC5 message.

Aspect 7 includes the method of any of aspects 1-6, detecting an incident, wherein the incident comprises an event in proximity of a location associated with the UE, and wherein the transmitting the notification comprises transmitting the notification based at least in part in response to the incident.

Aspect 8 includes a method of wireless communication performed by a first wireless communication device, the method comprising receiving, from one or more first user equipments (UEs) and one or more second wireless communication devices, data associated with the one or more first UEs, and sending, to the one or more first UEs, an indication of a transmission frequency for transmitting a notification, wherein the transmission frequency is based at least in part on the data associated with the one or more first UEs.

Aspect 9 includes the method of aspect 8, further comprising receiving, from the one or more first UEs and the one or more second wireless communication devices, second data associated with the one or more first UEs, and sending, to the one or more first UEs, an indication of a second transmission frequency for transmitting the notification, wherein the second transmission frequency is based on at least in part on the second data associated with the one or more first UEs, and the second transmission frequency is different from the transmission frequency.

Aspect 10 includes the method of any of aspects 8-9, wherein the one or more second wireless communication devices comprise at least one of a second UE, a roadside unit, a dedicated short range communications (DSRC)-equipped device, or a service server.

Aspect 11 includes the method of any of aspects 8-10, wherein the data associated with the one or more first UEs includes data associated with an environment in proximity of the one or more first UEs, statistical data associated with a type of a user of the one or more first UEs, activity information associated with the one or more first UEs, or active information associated with the one or more second wireless communication devices.

Aspect 12 includes the method of any of aspects 8-11, wherein the data associated with the one or more first UEs includes the data associated with the environment in proximity of the one or more first UEs, wherein the data associated with the environment in proximity of the one or more first UEs includes at least one of construction information, weather information, accident information, or road design information.

Aspect 13 includes the method of any of aspects 8-12, wherein the data associated with the one or more first UEs includes the statistical data associated with the type of the user of the one or more first UEs, wherein the statistical data associated with the type of the user of the one or more first UEs includes an accident occurrence frequency corresponding to the type of the user, and accident occurrence conditions corresponding to the type of the user.

Aspect 14 includes the method of any of aspects 8-13, wherein the data associated with the one or more first UEs includes the activity information associated with the one or more first UEs, wherein the activity information associated with the one or more first UEs includes at least one of the type of the user associated with the one or more first UEs, an activity of the user associated with the one or more first UEs, a location of the one or more first UEs, a direction of a movement of the one or more first UEs, or a speed of the movement of the one or more first UEs.

Aspect 15 includes the method of any of aspects 8-12, wherein the sending the indication of the transmission frequency comprises sending, to the one or more first UEs, the indication of the transmission frequency via a Uu message, or a PC5 message.

Aspect 16 includes a user equipment (UE) comprising one or more memories, one or more transceivers, and one or more processor in communication with the one or more memories and the one or more transceivers, the one or more memories storing instructions that are executable by the one or more processors, individually or in any combination, to cause the UE to perform any one or more of aspects 1-7.

Aspect 17 includes a first wireless communication device comprising one or more memories, one or more transceivers, and one or more processor in communication with the one or more memories and the one or more transceivers, the one or more memories storing instructions that are executable by the one or more processors, individually or in any combination, to cause the first wireless communication device to perform any one or more of aspects 8-15.

Aspect 18. A user equipment (UE) comprising one or more means to perform any one or more of aspects 1-7.

Aspect 19. A wireless communication device comprising one or more means to perform any one or more of aspects 8-15.

Aspect 20. A non-transitory computer-readable medium storing one or more instructions for wireless communication, the one or more instructions comprising one or more instructions that, when executed by one or more processors of a user equipment (UE), cause the user equipment (UE) to perform any one or more of aspects 1-7.

Aspect 21. A non-transitory computer-readable medium storing one or more instructions for wireless communication, the one or more instructions comprising one or more instructions that, when executed by one or more processors of a wireless communication device, cause the wireless communication device to perform any one or more of aspects 8-15.

Aspect 22. A method, device, apparatus, computer program product, non-transitory computer-readable medium, user equipment, base station, network entity, network node, wireless communication device, and/or processing system in accordance with one or more of aspects 1-15 and/or as described herein with reference to the accompanying detailed description and/or drawings.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations may be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed at a user equipment (UE), the method comprising:

transmitting, to a network unit, activity information associated with the UE;

receiving, from the network unit, an indication of a transmission frequency for transmitting a notification, wherein the transmission frequency is based at least in part on the activity information associated with the UE and the transmission frequency is based at least in part on one or more static environmental conditions associated with the UE, one or more dynamic environmental conditions associated with the UE, and an expected power source of the UE; and transmitting the notification based on the transmission frequency.

2. The method of claim 1, further comprising:

receiving, from the network unit, an indication of a second transmission frequency for transmitting the notification, wherein the second transmission frequency is different from the transmission frequency; and transmitting the notification based on the second transmission frequency.

3. The method of claim 1, wherein the notification comprises a safety message that includes a dynamic status of a user associated with the UE.

4. The method of claim 3, wherein the dynamic status of the user associated with the UE comprises a location of the UE, a motion state of the UE, a path history associated with the UE, and a path prediction associated with the UE.

5. The method of claim 1, wherein the activity information comprises at least one of a type of a user associated with the UE, an activity of the user associated with the UE, a location of the UE, a direction of movement of the UE, or a speed of movement of the UE.

6. The method of claim 1, wherein the receiving the indication of the transmission frequency comprises:

receiving, from the network unit, the indication of the transmission frequency via a Uu message or a PC5 message.

7. The method of claim 1, further comprising:

detecting an incident, wherein the incident comprises an event in proximity of a location associated with the UE; and wherein the transmitting the notification comprises transmitting the notification based at least in part in response to the incident.

8. A method of wireless communication performed by a first wireless communication device, the method comprising:

receiving, from one or more first user equipments (UEs) and one or more second wireless communication devices, data associated with the one or more first UEs; and sending, to the one or more first UEs, an indication on of a transmission frequency for transmitting a notification, wherein the transmission frequency is based at least in part on the data associated with the one or more first UEs and the transmission frequency is based at least in part on one or more static environmental conditions associated with the one or more first UEs, one or more dynamic environmental conditions associated with the one or more first UEs, and an expected power source of the one or more first UEs.

9. The method of claim 8, further comprising:

receiving, from the one or more first UEs and the one or more second wireless communication devices, second data associated with the one or more first UEs; and sending, to the one or more first UEs, an indication of a second transmission frequency for transmitting the notification, wherein the second transmission frequency is based on at least in part on the second data associated with the one or more first UEs, and the second transmission frequency is different from the transmission frequency.

10. The method of claim 8, wherein the one or more second wireless communication devices comprise at least one of a second UE, a roadside unit, a dedicated short range communications (DSRC)-equipped device, or a service server.

11. The method of claim 8, wherein the data associated with the one or more first UEs includes data associated with an environment in proximity of the one or more first UEs, statistical data associated with a type of a user of the one or more first UEs, activity information associated with the one or more first UEs, or active information associated with the one or more second wireless communication devices.

12. The method of claim 11, wherein the data associated with the one or more first UEs includes the data associated with the environment in proximity of the one or more first UEs, wherein the data associated with the environment in proximity of the one or more first UEs includes at least one of construction information, weather information, accident information, or road design information.

13. The method of claim 11, wherein the data associated with the one or more first UEs includes the statistical data associated with the type of the user of the one or more first UEs, wherein the statistical data associated with the type of the user of the one or more first UEs includes an accident occurrence frequency corresponding to the type of the user, and accident occurrence conditions corresponding to the type of the user.

14. The method of claim 11, wherein the data associated with the one or more first UEs includes the activity information associated with the one or more first UEs, wherein the activity information associated with the one or more first UEs includes at least one of the type of the user associated with the one or more first UEs, an activity of the user associated with the one or more first UEs, a location of the one or more first UEs, a direction of a movement of the one or more first UEs, or a speed of the movement of the one or more first UEs.

15. The method of claim 8, wherein the sending the indication of the transmission frequency comprises:

sending, to the one or more first UEs, the indication of the transmission frequency via a Uu message, or a PC5 message.

16. A user equipment (UE) comprising:

one or more memories;

one or more transceivers; and one or more processor in communication with the one or more memories and the one or more transceivers, the one or more memories storing instructions that are executable by the one or more processors, individually or in any combination, to cause the UE to:

transmit, to a network unit, activity information associated with the UE;

receive, from the network unit, an indication of a transmission frequency for transmitting a notification, wherein the transmission frequency is based at least in part on the activity information associated with the UE and the transmission frequency is based at least in part on one or more static environmental conditions associated with the UE, one or more dynamic environmental conditions associated with the UE, and an expected power source of the UE; and transmit the notification based on the transmission frequency.

17. The UE of claim 16, wherein the UE is further configured to:

receive, from the network unit, an indication of a second transmission frequency for transmitting the notification, wherein the second transmission frequency is different from the transmission frequency; and transmit the notification based on the second transmission frequency.

18. The UE of claim 16, wherein the notification comprises a safety message that includes a dynamic status of a user associated with the UE.

19. The UE of claim 18, wherein the dynamic status of the user associated with the UE comprises a location of the UE, a motion state of the UE, a path history associated with the UE, and a path prediction associated with the UE.

20. The UE of claim 16, wherein the activity information comprises at least one of a type of a user associated with the UE, an activity of the user associated with the UE, a location of the UE, a direction of movement of the UE, or a speed of movement of the UE.

21. The UE of claim 16, wherein the receiving the indication of the transmission frequency comprises:

receiving, from the network unit, the indication of the transmission frequency via a Uu message, or a PC5 message.

22. The UE of claim 16, wherein the UE is further configured to:

detect an incident, wherein the incident comprises an event in proximity of a location associated with the UE; and wherein the transmitting the notification comprises transmitting the notification based at least in part in response to the incident.

23. A first wireless communication device comprising:

one or more memories;

one or more transceivers; and one or more processor in communication with the one or more memories and the one or more transceivers, the one or more memories storing instructions that are executable by the one or more processors, individually or in any combination, to cause the first wireless communication device to:

receive, from one or more first user equipments (UEs) and one or more second wireless communication devices, data associated with the one or more first UEs; and send, to the one or more first UEs, an indication of a transmission frequency for transmitting a notification, wherein the transmission frequency is based at least in part on the data associated with the one or more first UEs and the transmission frequency is based at least in part on one or more static environmental conditions associated with the one or more first UEs, one or more dynamic environmental conditions associated with the one or more first UEs, and an expected power source of the one or more first UEs.

24. The first wireless communication device of claim 23, wherein the first wireless communication device is further configured to:

receive, from the one or more first UEs and the one or more second wireless communication devices, second data associated with the one or more first UEs; and send, to the one or more first UEs, an indication of a second transmission frequency for transmitting the notification, wherein the second transmission frequency is based on at least in part on the second data associated with the one or more first UEs, and the second transmission frequency is different from the transmission frequency.

25. The first wireless communication device of claim 23, wherein the one or more second wireless communication devices comprise at least one of a second UE, a roadside unit, a dedicated short range communications (DSRC)-equipped device, or a service server.

26. The first wireless communication device of claim 23, wherein the data associated with the one or more first UEs includes data associated with an environment in proximity of the one or more first UEs, statistical data associated with a type of a user of the one or more first UEs, activity information associated with the one or more first UEs, or active information associated with the one or more second wireless communication devices.

27. The first wireless communication device of claim 26, wherein the data associated with the one or more first UEs includes the data associated with the environment in proximity of the one or more first UEs, wherein the data associated with the environment in proximity of the one or more first UEs includes at least one of construction information, weather information, accident information, or road design information.

28. The first wireless communication device of claim 26, wherein the data associated with the one or more first UEs includes the statistical data associated with the type of the user of the one or more first UEs, wherein the statistical data associated with the type of the user of the one or more first UEs includes an accident occurrence frequency corresponding to the type of the user, and accident occurrence conditions corresponding to the type of the user.

29. The first wireless communication device of claim 26, wherein the data associated with the one or more first UEs includes the activity information associated with the one or more first UEs, wherein the activity information associated with the one or more first UEs includes at least one of the type of the user associated with the one or more first UEs, an activity of the user associated with the one or more first UEs, a location of the one or more first UEs, a direction of a movement of the one or more first UEs, or a speed of the movement of the one or more first UEs.

30. The first wireless communication device of claim 23, wherein the sending the indication of the transmission frequency comprises:

Sending, to the one or more first UEs, the indication of the transmission frequency via a Uu message, or a PC5 message.

* * * * *